United States Patent [19]

Pluenneke

[11] 4,081,265

[45] Mar. 28, 1978

[54] POT WATER

[76] Inventor: Ricks H. Pluenneke, P.O. Box 128, Fort Worth, Tex. 76101

[21] Appl. No.: 718,316

[22] Filed: Aug. 27, 1976

[51] Int. Cl.$^2$ ............................................. C05D 9/00
[52] U.S. Cl. ......................................... 71/33; 71/50; 71/53; 71/64 R; 71/64 C
[58] Field of Search ...................... 71/1, 33, 50, 53, 58, 71/63, 64 A, 64 R, 64 C, 64 SC

[56] References Cited
U.S. PATENT DOCUMENTS

| | | | |
|---|---|---|---|
| 2,270,518 | 1/1942 | Ellis et al. | 71/64 C |
| 2,350,982 | 6/1944 | Borst | 71/1 |

Primary Examiner—Charles N. Hart
Assistant Examiner—Ferris H. Lander
Attorney, Agent, or Firm—Cushman, Darby & Cushman

[57] ABSTRACT

A method of providing a complete treatment for containerized plants so that they need never have tap water and fertilizer applied thereto, and a water solution for use in the complete treatment method. The water solution has a pH between 5.8 and 6.4 and less than 10 ppm Na and 5 ppm Cl, and at least 6 ppm N (in nitrate form), 6 ppm P, 25 ppm K, 3.6 ppm Mg, 14 ppm $SO_4$, and 0.05 ppm Fe. The water solution is periodically applied to containerized plants in place of tap water and fertilizer, and healthy plants result.

10 Claims, No Drawings

POT WATER

BACKGROUND OF THE INVENTION

In many areas of the country and the world, the tap water has a very high sodium, chloride and bicarbonate content, and in general is too alkaline for containerized plants. Containerized plants are especially susceptible to high-alkaline problems since the roots are confined in an enclosed area in which alkaline water has time to penetrate and be absorbed by the soil in the enclosed area, and no "flushing" of the salts out of the soil usually takes place. When containerized plants are subjected to too alkaline a growing medium, the growth of the plants is retarded, and the plants may wither and die. Also, when the pH is too high, the availability of some nutrients to the plants is diminished with further adverse effects on the plants. The addition of more tap water to the plants aggravates the situation even more since it is the tap water that builds up the alkalinity of the soil.

The problems caused by the application of tap water with high alkalinity to containerized plants is compounded by the fact that many nurserymen use a large amount of peat moss when potting plants, and the peat moss has a large affinity for — that is, a high exchange capacity with — salts (i.e., carbonates, bicarbonates, sodium and chlorine). Therefore, the salt content built up in the soil for the containerized plants is even more hazardous than if some other type of soil and the normal tap water were used. Also, oftentimes fertilizers that are applied to the plants can aggravate the problems associated with high alkalinity.

DESCRIPTION OF THE INVENTION

According to the method of the present invention, the use of tap water — and fertilizer — is entirely avoided and therefore the build-up in soil alkalinity associated with treatment of containerized plants with tap water is also avoided, and healthy plants result. (In the specification and claims, the term "containerized plants" means any plants having a root growth area that is restricted by a container, such as conventional potted house plants and conventional plants disposed in containers outside commercial establishments, etc., and opposed to plants that grow in the ground without any artificial containment of the roots thereof. In the specification and claims, the term "soil" includes all types of conventional solid plant growing mediums, including peat moss.) According to the method of the present invention, a water solution having given properties and nutrients (a modified weak hydroponic solution) is periodically applied to containerized plants, which water solution provides for all of the nutrient needs of the plants while preventing the build-up of the alkalinity of the soil in which the plants are growing.

The water solution that is applied to plants, according to the method of the present invention, has a pH of between 5.8 and 6.4, and has less than 10 parts/million (ppm) sodium (Na) and 5 ppm chlorine (Cl). The water solution also has at least 6 ppm nitrogen (N), in nitrate form, 6 ppm phosphate (P), 25 ppm potassium (K), 3.6 ppm magnesium (Mg), 14 ppm sulphate ($SO_4$) and 0.05 ppm iron (Fe). Since the water solution is slightly acid, with a minimum of salts therein, alkaline build-up in the soil is avoided, and since essential nutrients are applied to the plant in relatively low concentration, the necessary plant nutrients are provided while overfertilization is avoided. The water solution, according to the present invention, preferably is produced by adding essential nutrients and the like to distilled or deionized water, and monitoring the pH and salt concentration thereof and taking any necessary steps to remove excess salts or to adjust the pH thereof.

Of course, the exact nutrients that are necessary for the growth of any single species of plant vary from species to species, therefore in order to provide a complete treatment in place of tap water and fertilizer for some types of plants, other nutrients may be added to the water solution, according to the present invention. The basic solution, according to the present invention, in general provides for all of a containerized plant's needs, and any micronutrients that are also necessary usually are sufficiently provided in the soil in which the plant is growing. The amount of nutrients in the water solution can be increased as desired for particular species to be treated, and/or other nutrients can be added to the solution, the only limitation being that the plants are to remain healthy without supplementary addition of water and fertilizer, and that the application of tap water is to be avoided. For instance, the water solution can also contain at least 0.007 ppm Copper (Cu), 0.06 ppm Boron (B), 0.01 ppm Manganese (Mn) and 0.01 ppm Molybdenum (Mo).

In addition to providing essential nutrients to plants, by controlling the pH of the plant soil, the water solution, according to the present invention, insures that the nutrients that are present are available to the plants. When the pH is too high, there are some nutrients — such as P and Zinc (Zn) — that are not available to the plants. Thus, when tap water that is alkaline is used, some nutrients in the soil are not available to the containerized plants, while according to the means and method of the present invention, these nutrients are available since the pH is carefully controlled.

The water solution, according to the present invention, could be marketed in containers sold in grocery stores and nurseries and the like, with instructions thereon for use as a replacement for tap water and fertilizer, and slightly different solutions could be provided depending on the type of containerized plants that are to be treated.

It will thus be seen that according to the present invention, a method of treating containerized plants and a means for treating containerized plants has been provided that eliminates the need for the application of tap water and fertilizer to the plants (thus making the plant care somewhat simpler), while at the same time, ensuring that the plant soil does not become so alkaline that plant growth and health is affected. The water solution, according to the present invention, is a means for providing a complete treatment for containerized plants so that tap water and fertilizer need never be applied thereto and so that healthy plant growth results, and the method, according to the present invention, provides for periodic application of the water solution of the present invention to containerized plants in place of tap water and fertilizer so that healthy plant growth is achieved.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and means.

What is claimed is:

1. A method of providing a complete treatment for containerized plants in soil so that treatment thereof with tap water is avoided, said method comprising the step of
    periodically applying to a containerized plant in soil a water solution with a pH between 5.8 and 6.4 having less than about 10 ppm sodium, and 5 ppm chlorine, and having at least 6 ppm nitrogen, in nitrate form, 6 ppm phosphate, 25 ppm potassium, 3.6 ppm magnesium, 14 ppm sulphate and 0.05 ppm iron, in place of water and fertilizer, so that healthy plant growth is achieved.

2. A method as recited in claim 1 wherein the water solution that is periodically applied in place of water and fertilizer further contains at least 0.007 ppm copper.

3. A method as recited in claim 1 wherein the water solution that is periodically applied in place of water and fertilizer further contains at least 0.06 ppm boron.

4. A method as recited in claim 1 wherein the water solution that is periodically applied in place of water and fertilizer further contains at least 0.01 ppm manganese.

5. A method as recited in claim 1 wherein the water solution that is periodically applied in place of water and fertilizer further contains at least 0.01 ppm molybdenum.

6. An agricultural composition for providing a complete treatment for containerized plants in soil so that tap water and fertilizer need never be applied thereto and so that healthy plant growth results, said agricultural composition comprising a water solution with a pH between 5.8 and 6.4, said water solution having less than about 10 ppm sodium and 5 ppm chlorine, and at least 6 ppm nitrogen, in nitrate form, 6 ppm phosphate, 25 ppm potassium, 3.6 ppm magnesium, 14 ppm sulphate and 0.05 ppm iron.

7. An agricultural composition as recited in claim 6 wherein said water solution further contains at least 0.007 ppm copper.

8. An agricultural composition as recited in claim 6 wherein said water solution further contains at least 0.06 ppm boron.

9. An agricultural composition as recited in claim 6 wherein said water solution further contains at least 0.01 ppm manganese.

10. An agricultural composition as recited in claim 6 wherein said water solution further contains at least 0.01 ppm molybdenum.

* * * * *